United States Patent
Van As

(10) Patent No.: US 8,371,713 B2
(45) Date of Patent: Feb. 12, 2013

(54) ILLUMINATION DEVICE FOR PIXELATED ILLUMINATION

(75) Inventor: Marco Van As, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 404 days.

(21) Appl. No.: 12/676,636

(22) PCT Filed: Sep. 9, 2008

(86) PCT No.: PCT/IB2008/053631
§ 371 (c)(1),
(2), (4) Date: Mar. 5, 2010

(87) PCT Pub. No.: WO2009/034521
PCT Pub. Date: Mar. 19, 2009

(65) Prior Publication Data
US 2010/0302774 A1    Dec. 2, 2010

(30) Foreign Application Priority Data
Sep. 13, 2007 (EP) .................................. 07116291

(51) Int. Cl.
*F21V 11/00* (2006.01)
(52) U.S. Cl. ............................ 362/235; 362/231; 353/98
(58) Field of Classification Search .................. 362/245, 362/311.02, 231, 235, 240, 241, 246, 249.01, 362/296.01; 353/37, 98; 359/34; 385/129, 385/133
See application file for complete search history.

(56) References Cited

U.S. PATENT DOCUMENTS

| | | | |
|---|---|---|---|
| 4,345,308 A * | 8/1982 | Mouyard et al. | 362/332 |
| 6,367,949 B1 * | 4/2002 | Pederson | 362/240 |
| 6,474,839 B1 * | 11/2002 | Hutchison | 362/235 |
| 6,504,984 B1 * | 1/2003 | Wakeman et al. | 385/133 |
| 6,767,112 B2 | 7/2004 | Wu | |
| 6,796,690 B2 | 9/2004 | Bohlander | |
| 6,950,454 B2 * | 9/2005 | Kruschwitz et al. | 372/92 |
| 7,077,525 B2 | 7/2006 | Fischer et al. | |
| 7,278,755 B2 * | 10/2007 | Inamoto | 362/240 |
| 7,524,089 B2 * | 4/2009 | Park | 362/294 |

(Continued)

FOREIGN PATENT DOCUMENTS

| | | |
|---|---|---|
| JP | 2006221840 A | 8/2006 |
| WO | 0250472 A1 | 6/2002 |

(Continued)

Primary Examiner — John A Ward
(74) Attorney, Agent, or Firm — Mark L. Beloborodov

(57) ABSTRACT

An illumination device (1) for pixelated illumination of a target area (3) comprising: an array (4) of light emitting devices; projection optics (5) arranged in between the array (4) of light emitting devices and the target area (3); a reflecting structure (6) having a first opening (9) facing the array (4) of light emitting devices and a second opening (10) facing the projection optics (5), and a reflective surface connecting the first and second opening, the surface enclosing and facing an optical axis (11) of the projection optics (5). The projection optics (5) is adapted to image the array (4) of light emitting devices, and a virtual extension thereof created by the reflecting structure (6), onto the target area (3), thereby generating an extended pixelated illumination pattern (2). By utilizing a reflecting structure to create a virtual extension of the array of light emitting devices, a high degree of pixelation can be achieved in the illumination pattern while minimizing the number of light emitting devices required. Thus, increased efficiency and reduce costs can be achieved.

15 Claims, 5 Drawing Sheets

U.S. PATENT DOCUMENTS

| | | | |
|---|---|---|---|
| 7,648,244 B2 * | 1/2010 | Lee et al. | 353/31 |
| 7,736,019 B2 * | 6/2010 | Shimada et al. | 362/244 |
| 7,828,463 B1 * | 11/2010 | Willis | 362/276 |
| 7,915,627 B2 * | 3/2011 | Li | 257/98 |
| 2002/0093820 A1 * | 7/2002 | Pederson | 362/241 |
| 2005/0152146 A1 | 7/2005 | Owen et al. | |
| 2005/0243042 A1 | 11/2005 | Shivji | |
| 2006/0139953 A1 | 6/2006 | Chou et al. | |
| 2006/0215402 A1 | 9/2006 | Koren et al. | |
| 2008/0084701 A1 * | 4/2008 | Van De Ven et al. | 362/373 |

FOREIGN PATENT DOCUMENTS

| | | |
|---|---|---|
| WO | 2006033032 A1 | 3/2006 |
| WO | 2006091538 A2 | 8/2006 |
| WO | 2007016282 A2 | 2/2007 |

* cited by examiner

ILLUMINATION DEVICE FOR PIXELATED ILLUMINATION

TECHNICAL FIELD

The present invention relates to an illumination device for pixelated illumination of a target area.

BACKGROUND OF THE INVENTION

Enhanced lumen output of light emitting diodes (LEDs) has led to better possibilities when it comes to utilizing LEDs in illumination systems. Especially systems for creating patterns of multiple colors and light intensities are attractive in applications such as, for example, stage and studio illumination, and dynamic illumination systems for consumers.

There are already numerous illumination systems using LEDs on the market. However, providing a high degree of pixelation typically requires a large number of LEDs. Therefore, current illumination systems are associated with high costs, and consequently mainly designed for the professional market. Thus, there is a need for an improved cost efficient illumination device for pixelated illumination of a target area.

SUMMARY OF THE INVENTION

In view of the above-mentioned and other drawbacks of prior art, a general object of the present invention is to provide an illumination device for pixelated illumination that, while having a limited number of LEDs, provides a high degree of pixelation of the projected image, a more efficient illumination, and reduced costs.

According to an aspect of the invention, there is provided an illumination device for pixelated illumination of a target area comprising: an array of light emitting devices; projection optics arranged in between the array of light emitting devices and the target area; a reflecting structure having a first opening facing the array of light emitting devices and a second opening facing the projection optics, and a reflective surface connecting the first and second opening, the surface enclosing and facing an optical axis of the projection optics, wherein the projection optics is adapted to image the array of light emitting devices, and a virtual extension thereof created by the reflecting structure, onto the target area, thereby generating an extended pixelated illumination pattern.

By utilizing a reflecting structure to create a virtual extension of the array of light emitting devices, a high degree of pixelation can be achieved in the illumination pattern while minimizing the number of light emitting devices required. This reduces the costs associated with the illumination device. The reflecting structure also improves the total system efficiency, as light that normally would not be captured by the projection optics, will be redirected by the reflecting structure in such a way that it passes the projection optics. Thus, this light is not lost and enables images to be created at larger angles.

U.S. Pat. No. 7,077,525 disclose an LED array, a light pipe, and a imaging lens to illuminate a surface. The imaging lens is here arranged to image the light pipe output face. The illumination achieved by this arrangement will be uniform in brightness due to the mixing or homogenization within the light pipe. Thus, there is a fundamental difference between the arrangement in U.S. Pat. No. 7,077,525 and the present invention. The present invention image the array of light emitting devices, rather than the exit window of the light pipe.

Thus, with an arrangement according to the present invention a pixelated illumination pattern can be achieved rather than uniform illumination.

The present invention is based on the understanding that by arranging a reflecting structure between the array of light emitting devices and the projection optics, a virtual extension of the array of light emitting devices can be achieved. By arranging the projection optics to image the array of light emitting devices and the virtual extension thereof, a pixelated illumination pattern can be created limited primarily by the field of the projection optics. The field of the projection optics here refers to the lateral position with respect to the optical axis that will be imaged correctly by the projection optics. Thus, the number of light emitting devices can be reduced to an optimum amount to have a sufficient level of addressable pixels.

The first opening can be located adjacent to a plane in which the array of light emitting devices are arranged. This enables a regular illumination pattern to be created, as a gap otherwise may occur in the resulting illumination pattern between the part corresponding to the array of light emitting devices and the part corresponding to the virtual extension thereof. The same purpose can be achieved by arranging the first opening somewhat below the array of light emitting devices.

The first opening can be arranged around the array of light emitting devices.

A cross-section of the first opening may have a shape essentially corresponding to the shape of the array of light emitting devices. This enables a regular pixelation in the resulting pixelated illumination pattern.

A cross-section of the first opening may have a shape essentially corresponding to the shape of the projection optics to improve the efficiency.

A cross-section of the first opening may have a shape selected from the group consisting of triangle, rectangular, pentagon, hexagon, circular and octagon. Thus, a good approximation of the projection optics can be achieved, while the reflecting structure is practically feasible to produce, thereby achieving both good performance and cost efficiency.

A cross-section of the reflecting structure may have a shape essentially corresponding to the shape of the cross-section of the first opening throughout the extension of the reflecting structure. This prevents distortion of the part of the image corresponding to the virtual extension of the array of light emitting devices. Even though the shape of the cross-section is consistent throughout the length of the reflecting structure, the size of the cross-section may vary.

A distance between the array of light emitting devices and the reflecting structure, measured in a plane where the light emitting devices are arranged, may correspond to half the spacing between the light emitting devices comprised in the array of light emitting devices. This enables a regular pixelated illumination pattern to be created.

A relationship between: a distance v between the array of light emitting devices and the projection optics, and a distance b between the projection optics and the target area, can be expressed as:

$$\frac{1}{f} = \frac{1}{v} + \frac{1}{b}$$

where f is the focal length of the projection optics. In this way the right focus can be adjusted to achieve a sharp pixelated illumination pattern. However, as it may sometimes be desirable to create blurred illumination patterns that will form a smooth image, it is possible to deviate from these relations, for example, by having a relatively larger or shorter distance v between the array of light emitting devices and the projection optics.

According to one embodiment, an extension of the reflective structure, in the direction of the optical axis, is such that an outer periphery of the second opening is tangent to an imaginary straight line drawn from the periphery of the projection optics through the optical axis to the periphery of an area, in the plane where the array of light emitting devices are arranged, corresponding to the area that can be captured by the projection optics. This maximizes the virtual extension of the array of light emitting devices, while avoiding excessive darkening of the part of the pixelated illumination pattern corresponding to the array of light emitting devices, i.e. the centre region of the pixelated illumination pattern.

The reflective surface can be parallel to the optical axis. By arranging the reflective surface parallel to the optical axis the virtual extension of the array of light emitting devices may correspond to an infinite array of light emitting devices. This also prevents a squeeze of the resulting pixelated illumination pattern.

According to an embodiment, a cross-section of the first opening is smaller than a cross-section of the second opening. Such a tapered reflecting structure may be advantageous as the virtual extension of the array of light emitting devices is "squeezed" so that smaller projection optics can be used. Using a conventional illumination device having a larger number of light emitting devices to achieve the same pixelation is much less efficient with the same lens parameters. To get the same efficiency and pixelation for a conventional illumination device, as is achieved by utilizing a virtual extension of the array of light emitting devices, the projection optics have to be larger in size. Thus, by utilizing a virtual extension of the array of light emitting devices the need for bulky optics to achieve a sufficient efficiency can be avoided also for illumination patterns having a high degree of pixelation enabling a compact design. Efficiency here refers to the ratio between generated lumens and lumens of the target area.

The reflective surface connecting the first and second opening may be such that for any point on a periphery of the first opening an imaginary straight line can be drawn along said surface to a point on an periphery of the second opening.

The reflective surface may be formed by at least three essentially flat walls arranged side-by-side. In a simple example, each wall can be essentially rectangular.

The projection optics may be a projection lens.

The array of light emitting devices may comprises at least a first light emitting diode (R) of a first color and at least a second light emitting diode (G) of a second color, wherein the first and the second colors are distinct from each other. By utilizing light emitting devices of different colors patterns of multiple colors and light intensities can be generated.

A light-shaping diffusor can be arranged between the array of light emitting devices and the projection optics, preferably at a distance from the projection optics being ½ of the focal length of the lens, to create blurred images of the light emitting devices. Thus, a smooth pattern with no visible transitions between the light emitting devices can be achieved. Without a diffusor, individual light emitting devices may be visible since the light emitting devices have a physical size and cannot be placed next to each other with no spacing in the array of light emitting devices. Also, the light emitting area normally does not extend throughout the whole area of the light emitting device.

Other objectives, features and advantages will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

A preferred embodiment of the present invention will be described with reference to FIGS. 1 to 5.

Figure 1:
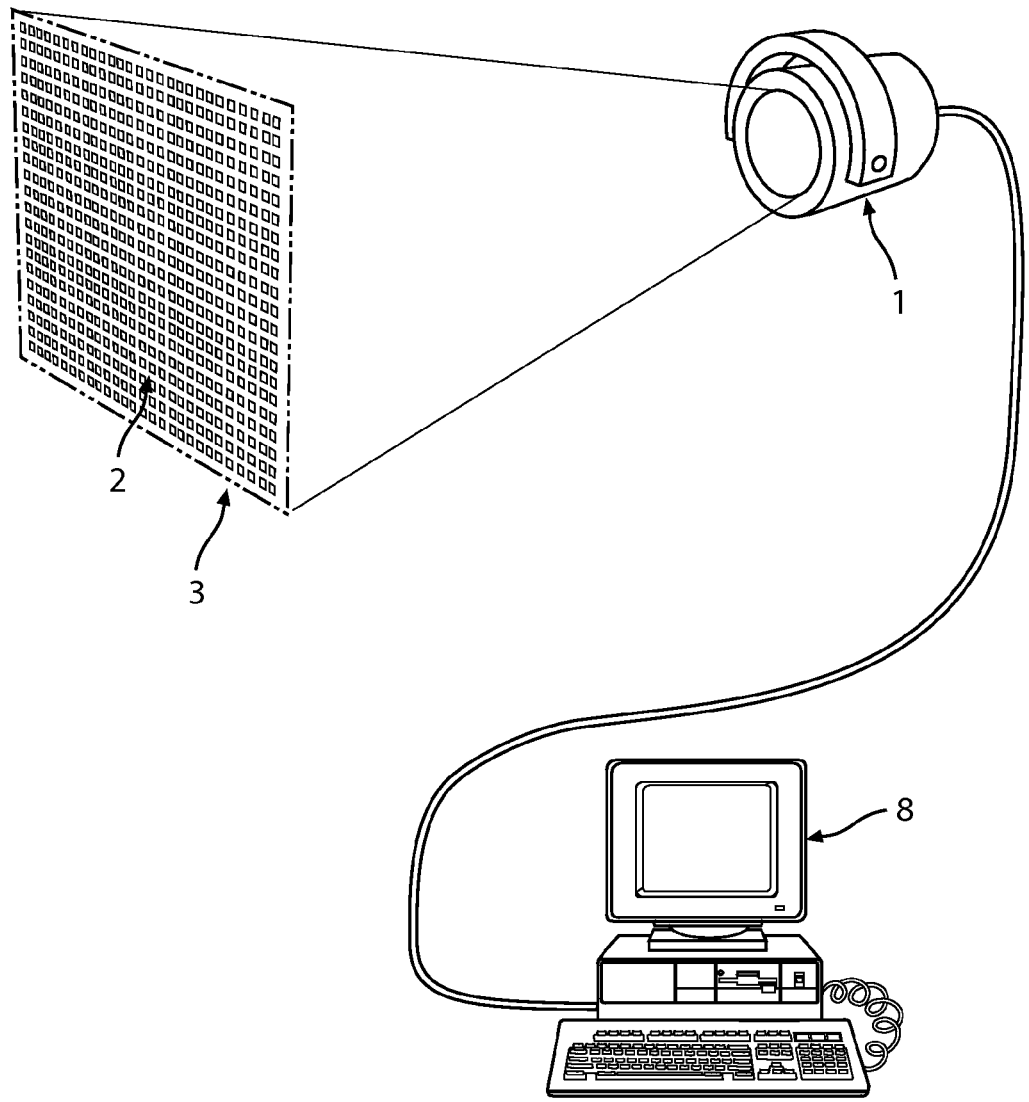
FIG. 1 is a schematic view of a projection system according to the invention.

FIG. 1 illustrates an illumination device 1 arranged to generate a pixelated illumination pattern 2 on a target area 3, such as a screen 3. The illumination device 1 is connected to a user interface 8 enabling a user to control the illumination.

Figure 2:
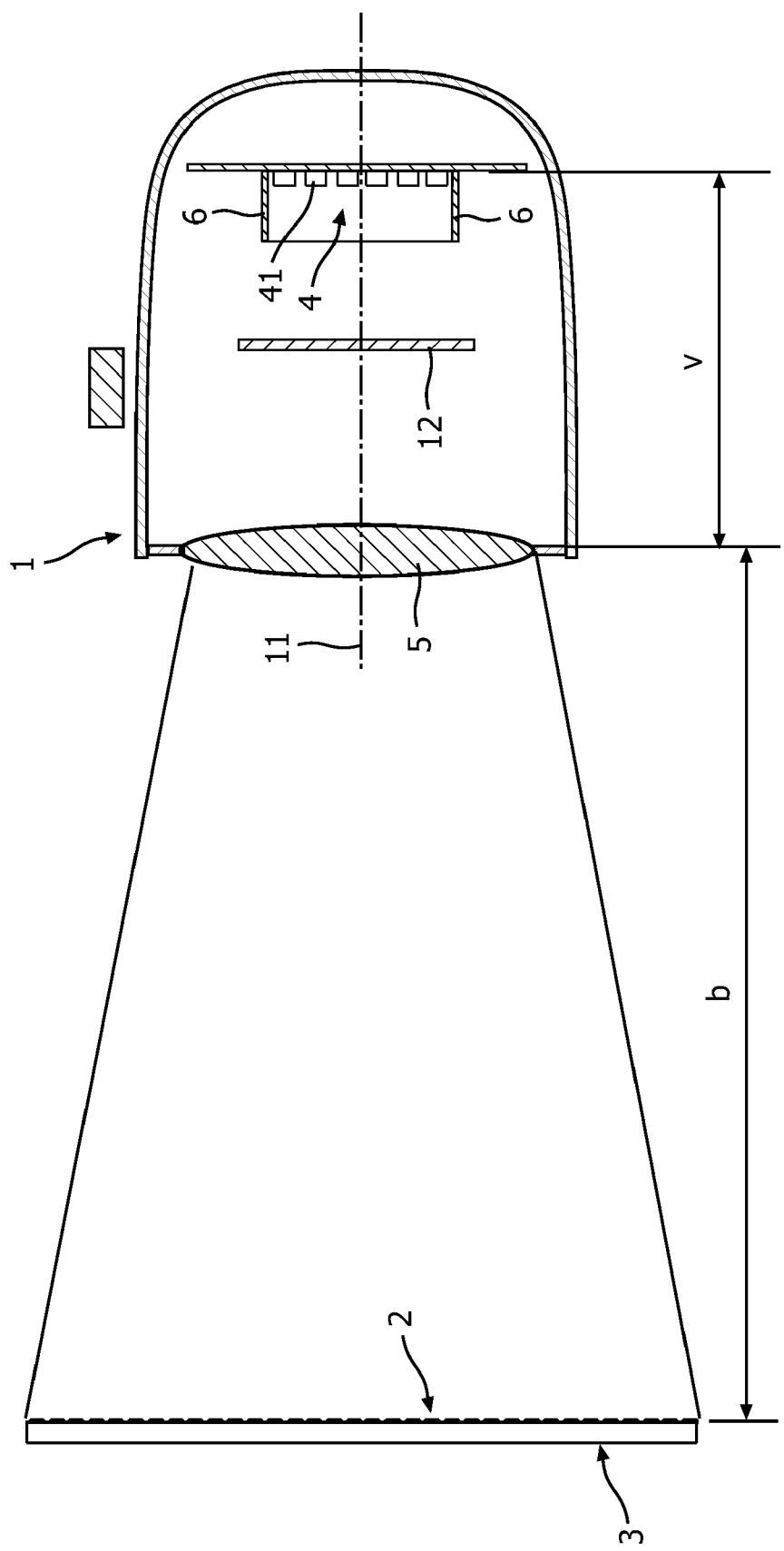
FIG. 2 is a sectional view of an arrangement of components comprised in an illumination device.

As depicted in FIG. 2, the illumination device 1 comprises an array 4 of light emitting devices, projection optics 5, such as a lens, and a reflecting structure 6 arranged in between the array 4 of light emitting devices and the projection optics 5. The array 4 of light emitting devices, hereinafter referred to as LED array, can comprise separate light emitting diodes 41 (LEDs) of various colors, such as, red (R), green (G) and blue (B). Alternatively it may comprise LED modules with different colors in one package. The LEDs 41 are arranged on a printed circuit board (PCB) along with associated driving electronics. The LEDs 41 are here uniformly distributed over the area of the LED array 4 thereby forming a square matrix. The number of LEDs used may vary. An illumination device provided with 8×8 array of RGB-packages has been tested with a resulting picture of good resolution picture. For consumer applications a smaller LED array probably would suffice such as, for example, an array of 5×5 RGB packages. In alternative embodiments, the LED array 4 could have a shape that more resembles the shape of the projection optics to further improve the efficiency. For example, a hexagon shaped LED array 4 could be used to better approximate a circular lens.

The LED array 4 can be connected to a central processing unit (CPU) which can individually address and drive the different LEDs 41 through an electronic control system. The CPU, which is typically equipped with a memory for storing predefined and/or user generated image sequences, is connected to the user interface 8, thereby enabling the user to control the pixelated illumination.

Figure 3:
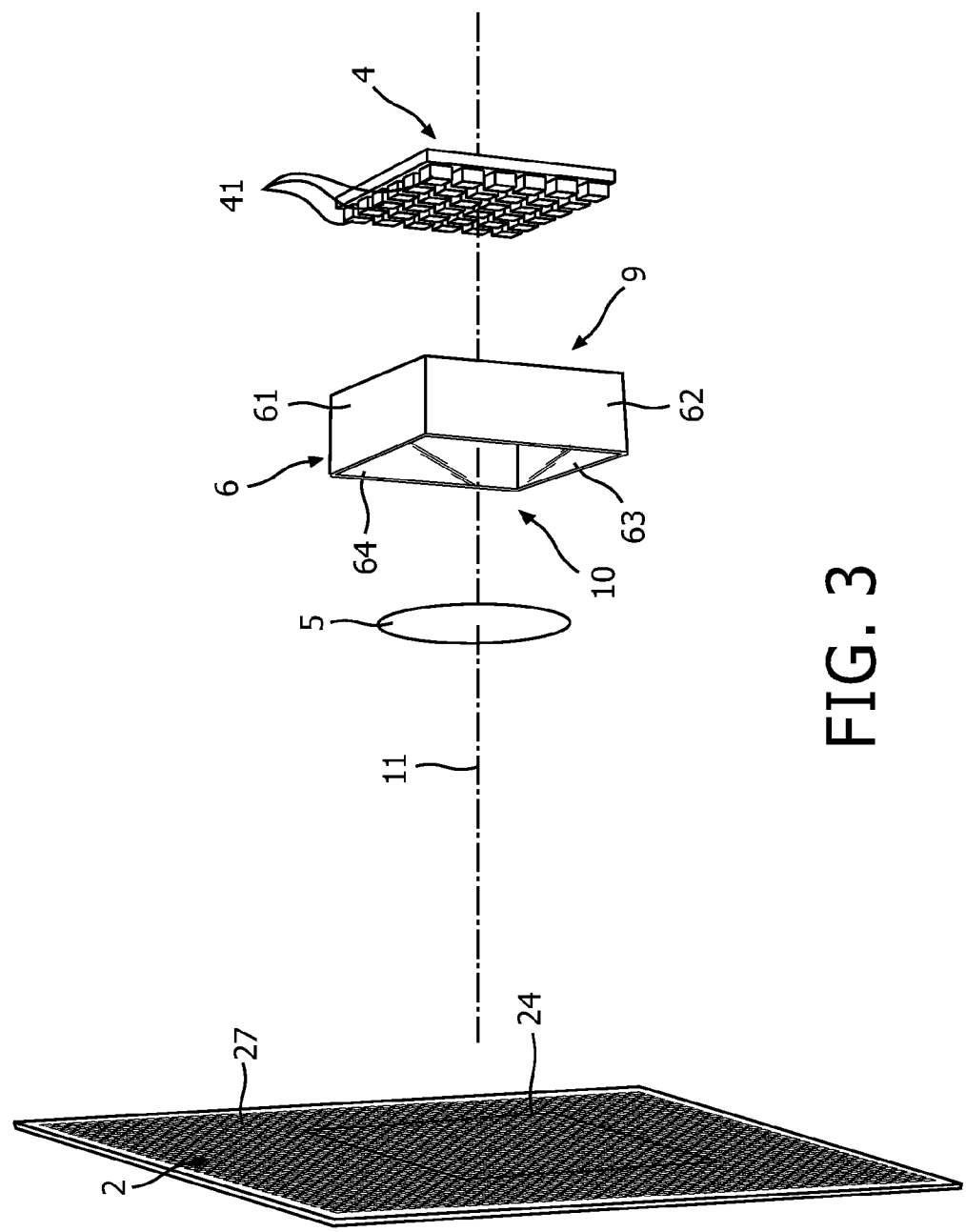
FIG. 3 is a schematic view of an arrangement of an array of light emitting devices, a reflecting structure and projection optics.

As depicted in FIG. 3, the reflecting structure 6, also referred to as mirror structure 6, here comprises four essentially flat mirror walls 61-64. As the mirror walls 61-64 are arranged next to each other they form a tube, having a square-shaped cross-section, with a first opening 9 facing the LED array 4 and a second opening 10 facing the lens 5. The mirror structure 6 is arranged around the LED array 4, with the reflective surface of the mirror structure 6 enclosing an optical axis 11 of the lens 5. The first opening 9 is preferably arranged in the plane or somewhat below the plane of the LED array 4. The LED array 4 essentially fills the first opening 9 of the mirror structure 6, and the distance between the LED array 4 (i.e. the LEDs 41 arranged next to the mirror walls) and the mirror walls 61-64, measured in the plane where the LED array 4 is arranged, corresponds to half the spacing between the LEDs 41 of the LED array 4. A rectangular LED array 4 is preferably mirrored by a rectangular or hexagonal mirror structure 6 for symmetry purposes. The hexagonal mirror structure may be advantageous for a circular lens as it resembles the shape of the lens better.

The effect of the mirror structure will now be described referring to FIGS. 3, 4 and 5. As light is emitted from the LED array 4 some of it will be reflected by the mirror structure 6 resulting in a virtual extension 7 of the LED array. The LED array 4 and the virtual extension 7 thereof is imaged by the lens 5 thereby obtaining an extended illumination pattern 2 on the screen 3. Here the central part of the image 24 corresponds to the LED array 4, whereas the surrounding region 27 corresponds to the virtual extension 7 of the LED array.

Figure 4:
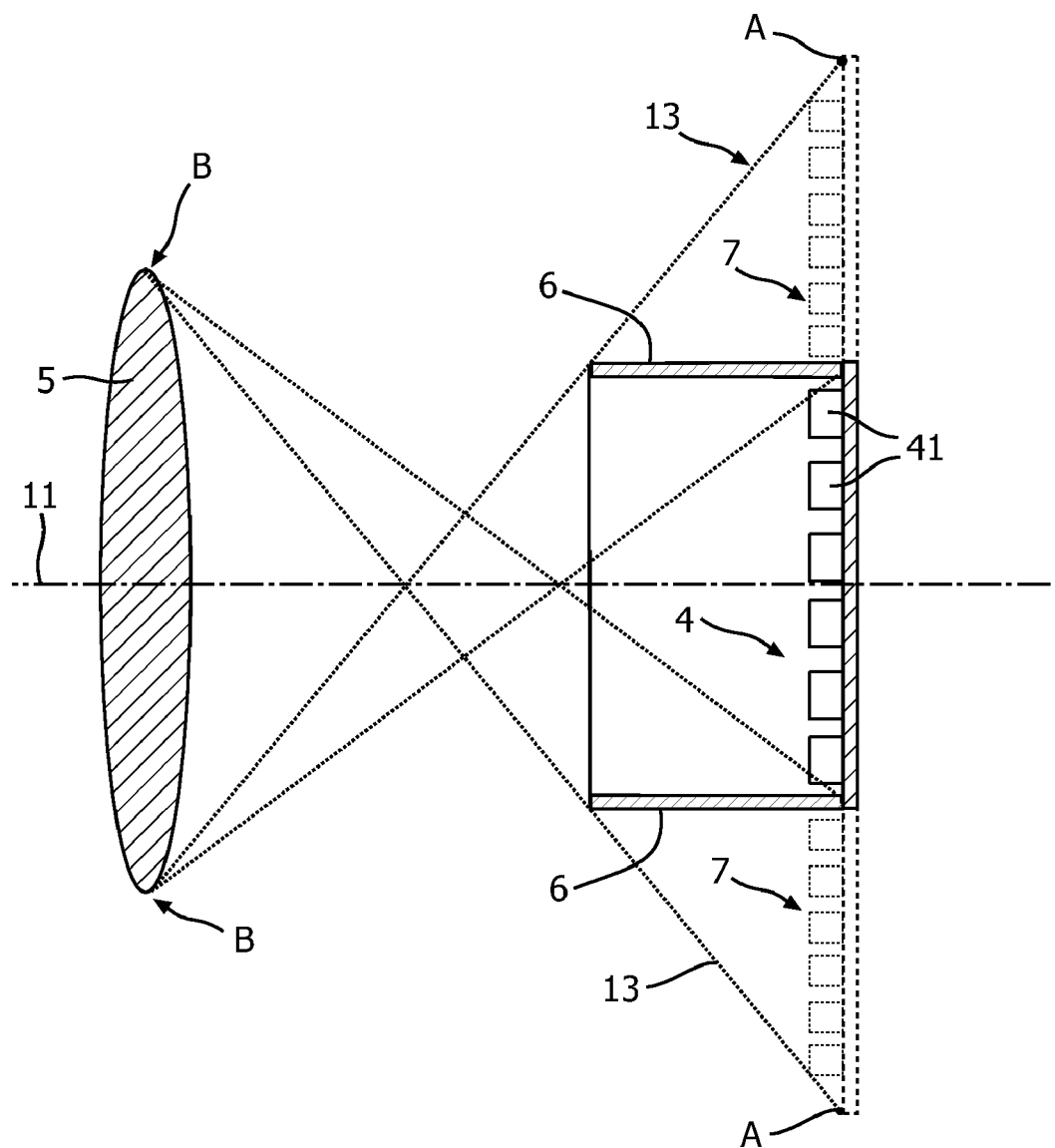
FIG. 4 illustrates a rule of thumb for selecting a suitable height of a non-tapered reflecting structure.

A non-tapered mirror structure 6, with the mirrors 61-64 arranged parallel to the optical axis 11 as illustrated in FIG. 4, will give the effect of an optically infinitely large LED array. Thus, the resulting extended illumination pattern 2 is limited primarily by the field of the projection lens. Furthermore, the virtual extension 7 is in the same plane as the LED array 4, and thus enables a regular pattern to be created.

The height of the mirror structure 3 (i.e. its extension in direction of the optical axis 11) may vary, and typically depends on factors, such as, the diameter of the lens, the focal length and the field of the lens. However, FIG. 4 illustrates a good rule of thumb in determining the height for a non-tapered mirror structure. Here the mirror structure 6 is just so high that a ray starting at the edge of the useable field of the lens in the virtual extension 7 of the array of light emitting devices hits the aperture of the lens 5 and is properly imaged. The field of the lens here refers to the lateral position with respect to the optical axis 11 that will be imaged correctly by the lens 5

In other words, an imaginary straight line 13 drawn from a point A on the periphery of the field of the lens, in the plane where the LED array 4 is arranged, through the optical axis of the projection system to a point B on the periphery of the projection optics will be tangent to the second opening 9 of the mirror structure 6.

If the mirror structure 6 would be higher than in FIG. 4, the size of the virtual extension 7 would remain the same. Furthermore, the illumination from the virtual extension 7 would become more intense, whereas the illumination from the LED array 4 would become less intense, i.e. the central part of the image would be darkened. If, on the other hand, the mirror structure 6 were lower this would result in a smaller virtual extension 7 of the LED array.

Figure 5:
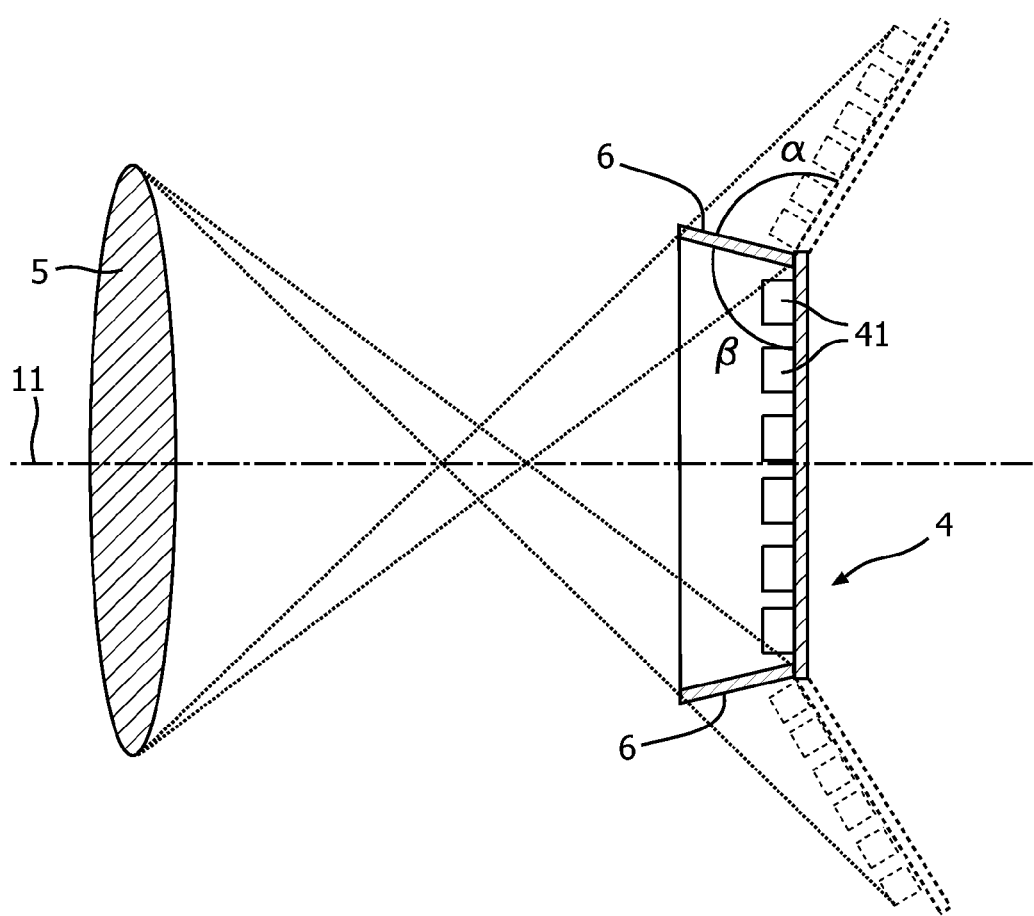
FIG. 5 illustrates a rule of thumb for selecting a suitable height of a tapered reflecting structure.

FIG. 5 illustrates a corresponding situation for a tapered mirror structure. The mirror structure 6 is just so high that a ray starting at the edge of the useable field of the lens in the virtual extension 7 of the array of light emitting devices hits the aperture of the lens 5 and is properly imaged.

For a tapered mirror structure 6, with the first opening 9 smaller than the second opening 10, as illustrated in FIG. 5, the virtual extension 7 is no longer in the same plane as the LED array as the mirror wall 6 is no longer perpendicular to the plane in which the LED array 4 is arranged. This can be understood as the angle β between the mirror structure 6 and the plane in which the LED array 4 is arranged always is the same as the angle α between the mirror structure 6 and the virtual extension 7. Thus, the virtual extension 7 of the array of light emitting devices is "squeezed", allowing smaller projection optics 5 to be used.

Referring to FIG. 2, the lens 5 arranged in between the LED array 4 and the screen 2 is here a single projection lens. To provide a sharp illumination pattern, a suitable distance v between the LED array 4 and the lens 5 can be derived from:

$$\frac{1}{f} = \frac{1}{v} + \frac{1}{b}$$

where f is the focal length of the projection optics and b is the distance between the lens 5 and the screen 3. The distance v between the LED array 4 and the lens 5, can be varied a little to adjust the focus. The distance v can also be deliberately shorter or longer to create a blurred image.

Moreover, a light shaping diffusor 12, for example commercially available from the company POC, can be arranged somewhere in between the LED array 4 and the lens 5 to create a smooth projection of the LEDs. The distance between the light shaping diffusor 12 and the lens 5 being about ½ of the focal length of the lens 5. The diffusor 12 creates a smooth projection of the LEDs 41 avoiding individual LEDs 41 to be visible. To allow individual LEDs 41 to be visible in the pixelated illumination pattern, the diffusor can be removed.

According to an embodiment of a projection system, comprising one or more illumination devices 1, a user can control the illumination pattern 2 through the user interface 8. User input is stored on the memory of the CPU. During illumination the CPU individually addresses and drives the separate light emitting devices 41 through the electronic control system based on predefined and/or user generated image sequences stored on the memory. As light is emitted from the LED array 4 some of the light will be reflected by the reflecting structure 6 creating a virtual extension 7 of the array 4 of light emitting devices. The array 4 of light emitting devices and the virtual extension 7 thereof are imaged by the lens 5, thereby generating an extended pixelated illumination pattern 2 on the screen 3.

The invention has mainly been described above with reference to a few embodiments. However, as is readily appreciated by a person skilled in the art, other embodiments than the ones disclosed above are equally possible within the scope of the invention, as defined by the appended patent claims.

For instance, the cross section of the reflecting structure 6 may vary along its longitudinal extension. Further, the sides of the mirror walls can be flat or bent, to create various patterns on the projection surface.

The invention claimed is:

1. An illumination device for pixelated illumination of a target area, the device comprising:
   an array of light emitting devices;
   projection optics arranged in between said array of light emitting devices and said target area; and
   a reflecting structure having a first opening facing said array of light emitting devices and a second opening facing said projection optics, and a reflective surface connecting said first and second opening, said surface enclosing and facing an optical axis of said projection optics, wherein said projection optics is configured to image said array of light emitting devices, and a virtual extension thereof created by said reflecting structure, onto said target area, thereby generating an extended pixelated illumination pattern, wherein a distance between said array of light emitting devices and the reflecting structure measured in a plane where the light emitting devices are arranged, corresponds to half the spacing between the light emitting devices comprised in the array of light emitting devices.

2. An illumination device according to claim 1, wherein said first opening is located adjacent to a plane in which said array of light emitting devices are arranged.

3. An illumination device according to claim 1, wherein said first opening is arranged around said array of light emitting devices.

4. An illumination device according to claim 1, wherein a cross-section of the first opening has a shape essentially corresponding to the shape of said array of light emitting devices.

5. An illumination device according to claim 1, wherein a cross-section of the first opening has a shape essentially corresponding to the shape of said projection optics.

6. An illumination device according to claim 1 wherein a cross-section of said first opening has a shape selected from the group consisting of: triangle, rectangular, pentagon, hexagon, circular and octagon.

7. An illumination device according to claim 1, wherein a cross-section of the reflecting structure has a shape essentially corresponding to the shape of the cross-section of the first opening throughout the extension of the reflecting structure.

8. An illumination device according to claim 1, wherein a relationship between a focal length f of the projection optics, a distance v between said array of light emitting devices and said projection optics, and a distance b between said projection optics and said target area, is defined by the following formula:

$$\frac{1}{f} = \frac{1}{v} + \frac{1}{b}.$$

9. An illumination device according to claim 1, wherein an extension of said reflecting structure in the direction of the optical axis, is such that an outer periphery of said second opening is tangent to an imaginary straight line drawn from the periphery of the projection optics through the optical axis to the periphery of an area, in the plane where said array of light emitting devices are arranged, corresponding to the area that can be captured by the projection optics.

10. An illumination device according to claim 1, wherein a cross-section of said first opening is smaller than a cross-section of said second opening.

11. An illumination device according to claim 1, wherein the reflective surface connecting the first and second opening is such that for any point on an periphery of said first opening an imaginary straight line can be drawn along said surface to a point on an periphery of said second opening.

12. An illumination device according to claim 1, wherein said reflective surface is formed by at least three essentially flat, essentially rectangular walls arranged side-by-side.

13. An illumination device according to claim 1, wherein said projection optics is a projection lens.

14. An illumination device according to claim 1, wherein said array of light emitting devices comprises at least a first light emitting diode (R) of a first color and at least a second light emitting diode (G) of a second color, wherein the first and the second colors are distinct from each other.

15. An illumination device according to claim 1, further comprising a light-shaping diffusor disposed between said array of light emitting devices and said projection optics.

* * * * *